United States Patent
Callaghan

(10) Patent No.: US 7,565,351 B1
(45) Date of Patent: Jul. 21, 2009

(54) AUTOMATION DEVICE DATA INTERFACE

(75) Inventor: David M. Callaghan, Concord, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 468 days.

(21) Appl. No.: 11/143,207

(22) Filed: Jun. 2, 2005

Related U.S. Application Data

(63) Continuation-in-part of application No. 11/079,152, filed on Mar. 14, 2005.

(51) Int. Cl.
*G06F 7/10* (2006.01)
*G05B 15/02* (2006.01)

(52) U.S. Cl. .................. 707/8; 707/1; 707/10; 707/100; 700/9; 700/17; 700/19; 700/20; 700/49; 709/201; 709/217; 709/218; 709/219

(58) Field of Classification Search ................ 709/246, 709/217–219, 223–224, 238–244, 201, 220; 707/10, 100–102, 1, 8; 700/96, 159, 169, 700/9, 17, 19–20, 49; 702/33
See application file for complete search history.

(56) References Cited

U.S. PATENT DOCUMENTS

| | | | |
|---|---|---|---|
| 4,570,217 A | 2/1986 | Allen et al. | |
| 4,771,606 A | 9/1988 | Mose et al. | |
| 5,068,778 A | 11/1991 | Kosem et al. | |
| 5,093,782 A | 3/1992 | Muraski et al. | |
| 5,296,851 A | 3/1994 | Ikuta et al. | |
| 5,537,548 A | 7/1996 | Fin et al. | |
| 5,602,936 A | 2/1997 | Green et al. | |
| 5,742,845 A * | 4/1998 | Wagner ................. | 710/11 |
| 5,748,930 A | 5/1998 | Prakash | |
| 5,808,907 A | 9/1998 | Shetty et al. | |
| 5,832,221 A | 11/1998 | Jones | |
| 5,873,086 A | 2/1999 | Fujii et al. | |
| 5,950,006 A | 9/1999 | Crater et al. | |

(Continued)

FOREIGN PATENT DOCUMENTS

WO 0167196 9/2001

OTHER PUBLICATIONS

"A Supervisory Tool for real-Time Industrial Automation Systems"—Junior, W. P. & Pereira, C. E.—Object-Oriented Real-Time Distributed Computing, 2003, Sixth IEEE International Symposium (ISORC'03)—May 14-16, 2003 (pp. 230-237).*

(Continued)

*Primary Examiner*—John E Breene
*Assistant Examiner*—Anh Ly
(74) *Attorney, Agent, or Firm*—Turocy & Watson LLP; R. Scott Speroff

(57) ABSTRACT

The subject invention pertains to facilitating communication between industrial automation devices such as controllers and data systems and/or services. Systems and methods are provided that receive statements or other unit of data interaction from an automation device, provide the statements to an appropriate system or service for processing, and optionally return a response such as a result set. Furthermore, in accordance with an aspect of the invention native controller code, variables, or tags can be mapped to stored data, procedures or combinations of data and/or procedures and updated automatically or semi-automatically.

16 Claims, 14 Drawing Sheets

U.S. PATENT DOCUMENTS

| Patent | Date | Name | Ref |
|---|---|---|---|
| 5,960,200 A | 9/1999 | Eager et al. | |
| 5,963,448 A | 10/1999 | Flood et al. | |
| 6,032,154 A * | 2/2000 | Coleman et al. | 707/104.1 |
| 6,061,603 A * | 5/2000 | Papadopoulos et al. | 700/83 |
| 6,105,017 A | 8/2000 | Kleewein et al. | |
| 6,157,649 A | 12/2000 | Peirce et al. | |
| 6,182,252 B1 | 1/2001 | Wong et al. | |
| 6,185,466 B1 | 2/2001 | Nicewonger | |
| 6,268,853 B1 | 7/2001 | Hoskins et al. | |
| 6,272,400 B1 * | 8/2001 | Jankins et al. | 700/282 |
| 6,282,454 B1 * | 8/2001 | Papadopoulos et al. | 700/83 |
| 6,298,377 B1 | 10/2001 | Hartikainen et al. | |
| 6,304,973 B1 | 10/2001 | Williams | |
| 6,311,149 B1 | 10/2001 | Ryan et al. | |
| 6,327,511 B1 | 12/2001 | Naismith et al. | |
| 6,345,259 B1 | 2/2002 | Sandoval | |
| 6,370,448 B1 | 4/2002 | Eryurek | |
| 6,389,470 B1 | 5/2002 | Barr | |
| 6,408,277 B1 | 6/2002 | Nelken | |
| 6,418,430 B1 | 7/2002 | DeFazio et al. | |
| 6,453,210 B1 | 9/2002 | Belotserkovskiy et al. | |
| 6,463,352 B1 * | 10/2002 | Tadokoro et al. | 700/169 |
| 6,484,177 B1 | 11/2002 | Van Huben et al. | |
| 6,505,247 B1 | 1/2003 | Steger et al. | |
| 6,556,950 B1 | 4/2003 | Schwenke et al. | |
| 6,560,235 B1 * | 5/2003 | Jones | 370/401 |
| 6,564,212 B2 | 5/2003 | Koskas | |
| 6,587,900 B1 | 7/2003 | Wischinski | |
| 6,608,638 B1 | 8/2003 | Kodosky et al. | |
| 6,618,856 B2 | 9/2003 | Coburn et al. | |
| 6,633,883 B2 | 10/2003 | Koskas | |
| 6,662,118 B2 * | 12/2003 | Carle et al. | 702/33 |
| 6,701,314 B1 | 3/2004 | Conover et al. | |
| 6,728,262 B1 | 4/2004 | Woram | |
| 6,732,191 B1 * | 5/2004 | Baker et al. | 710/1 |
| 6,751,562 B1 | 6/2004 | Blackett et al. | |
| 6,760,782 B1 | 7/2004 | Swales | |
| 6,763,040 B1 | 7/2004 | Hite et al. | |
| 6,779,051 B1 | 8/2004 | Basil et al. | |
| 6,801,920 B1 | 10/2004 | Wischinski | |
| 6,802,053 B1 * | 10/2004 | Dye et al. | 717/113 |
| 6,810,429 B1 | 10/2004 | Walsh et al. | |
| 6,819,960 B1 * | 11/2004 | McKelvey et al. | 700/17 |
| 6,822,945 B2 * | 11/2004 | Petrovykh | 370/270 |
| 6,832,118 B1 | 12/2004 | Heberlein et al. | |
| 6,842,779 B1 | 1/2005 | Nishizawa et al. | |
| 6,850,252 B1 | 2/2005 | Hoffberg | |
| 6,862,553 B2 | 3/2005 | Schwenke et al. | |
| 6,891,849 B1 | 5/2005 | Jasperneite et al. | |
| 6,944,555 B2 | 9/2005 | Blackett et al. | |
| 6,957,112 B2 | 10/2005 | Ina et al. | |
| 6,975,913 B2 | 12/2005 | Kreidler et al. | |
| 6,993,456 B2 | 1/2006 | Brooks et al. | |
| 7,043,532 B1 * | 5/2006 | Humpleman et al. | 709/223 |
| 7,055,056 B2 | 5/2006 | Bessire | |
| 7,058,712 B1 | 6/2006 | Vasko et al. | |
| 7,080,066 B1 | 7/2006 | Scheurich et al. | |
| 7,085,670 B2 * | 8/2006 | Odom et al. | 702/127 |
| 7,130,701 B1 | 10/2006 | Wischinski | |
| 7,151,966 B1 | 12/2006 | Baier et al. | |
| 7,162,510 B2 | 1/2007 | Jammes | |
| 7,162,534 B2 | 1/2007 | Schleiss et al. | |
| 7,181,487 B1 * | 2/2007 | Marbach et al. | 709/200 |
| 7,185,045 B2 * | 2/2007 | Ellis et al. | 709/200 |
| 7,194,446 B1 * | 3/2007 | Bromley et al. | 706/45 |
| 7,203,560 B1 | 4/2007 | Wylie et al. | |
| 7,206,643 B2 * | 4/2007 | Ruutu et al. | 700/9 |
| 7,216,043 B2 | 5/2007 | Ransom | |
| 7,216,109 B1 | 5/2007 | Donner | |
| 7,216,120 B2 * | 5/2007 | Yoshida et al. | 707/3 |
| 7,225,037 B2 | 5/2007 | Shani | |
| 7,233,830 B1 * | 6/2007 | Callaghan et al. | 700/9 |
| 7,248,978 B2 | 7/2007 | Ransom | |
| 7,251,535 B2 | 7/2007 | Farchmin et al. | |
| 7,266,476 B2 | 9/2007 | Coburn et al. | |
| 7,277,457 B2 * | 10/2007 | Gorday et al. | 370/509 |
| 7,293,038 B2 * | 11/2007 | Blevins et al. | 707/102 |
| 7,372,826 B2 | 5/2008 | Dahod et al. | |
| 7,395,122 B2 | 7/2008 | Kreidler et al. | |
| 7,457,815 B2 * | 11/2008 | Hsu et al. | 707/102 |
| 2002/0022982 A1 | 2/2002 | Cooperstone et al. | |
| 2002/0082736 A1 | 6/2002 | Lech et al. | |
| 2002/0087229 A1 | 7/2002 | Pasadyn et al. | |
| 2002/0116453 A1 | 8/2002 | Todorov et al. | |
| 2002/0120728 A1 * | 8/2002 | Braatz et al. | 709/223 |
| 2002/0124011 A1 * | 9/2002 | Baxter et al. | 707/200 |
| 2002/0133807 A1 | 9/2002 | Sluiman | |
| 2002/0174161 A1 | 11/2002 | Scheetz et al. | |
| 2002/0194365 A1 | 12/2002 | Jammes | |
| 2003/0023336 A1 * | 1/2003 | Kreidler et al. | 700/108 |
| 2003/0033376 A1 | 2/2003 | Brownhill et al. | |
| 2003/0051074 A1 | 3/2003 | Edwards | |
| 2003/0061384 A1 * | 3/2003 | Nakatani | 709/245 |
| 2003/0120803 A1 * | 6/2003 | Loughran et al. | 709/238 |
| 2003/0120817 A1 | 6/2003 | Ott et al. | |
| 2003/0140094 A1 | 7/2003 | Collier et al. | |
| 2003/0149718 A1 | 8/2003 | Theimer | |
| 2003/0154147 A1 | 8/2003 | Parry | |
| 2003/0208595 A1 * | 11/2003 | Gouge et al. | 709/225 |
| 2004/0010627 A1 * | 1/2004 | Ellis et al. | 709/250 |
| 2004/0025060 A1 * | 2/2004 | Raffaele et al. | 713/202 |
| 2004/0039468 A1 | 2/2004 | Zahorack et al. | |
| 2004/0057662 A1 * | 3/2004 | Morfino | 385/31 |
| 2004/0081197 A1 | 4/2004 | Liu | |
| 2004/0107345 A1 * | 6/2004 | Brandt et al. | 713/171 |
| 2004/0111512 A1 | 6/2004 | Barth | |
| 2004/0117624 A1 * | 6/2004 | Brandt et al. | 713/166 |
| 2004/0153171 A1 | 8/2004 | Brandt et al. | |
| 2004/0153819 A1 * | 8/2004 | Bjorsne et al. | 714/37 |
| 2004/0193439 A1 | 9/2004 | Marrott | |
| 2004/0201602 A1 | 10/2004 | Mody et al. | |
| 2004/0259531 A1 | 12/2004 | Wood et al. | |
| 2005/0010311 A1 | 1/2005 | Barbazette et al. | |
| 2005/0021676 A1 | 1/2005 | Chambers et al. | |
| 2005/0038853 A1 | 2/2005 | Blanc et al. | |
| 2005/0039040 A1 | 2/2005 | Ransom et al. | |
| 2005/0074036 A1 * | 4/2005 | Gorday et al. | 370/513 |
| 2005/0103767 A1 * | 5/2005 | Kainec et al. | 219/130.5 |
| 2005/0131551 A1 * | 6/2005 | Ruutu et al. | 700/1 |
| 2005/0138432 A1 * | 6/2005 | Ransom et al. | 713/201 |
| 2005/0144186 A1 | 6/2005 | Hesselink et al. | |
| 2005/0188351 A1 * | 8/2005 | Hoefler et al. | 717/106 |
| 2005/0198138 A1 * | 9/2005 | Heller et al. | 709/205 |
| 2005/0216897 A1 * | 9/2005 | Amrhein et al. | 717/136 |
| 2006/0002356 A1 | 1/2006 | Barany et al. | |
| 2006/0010318 A1 * | 1/2006 | Coley et al. | 713/150 |
| 2006/0026672 A1 * | 2/2006 | Braun | 726/9 |
| 2006/0031447 A1 * | 2/2006 | Holt et al. | 709/223 |
| 2006/0041661 A1 | 2/2006 | Erikson et al. | |
| 2006/0080409 A1 * | 4/2006 | Bieber | 709/220 |
| 2006/0108411 A1 * | 5/2006 | Macurek et al. | 235/375 |
| 2006/0129690 A1 * | 6/2006 | Hill et al. | 709/230 |
| 2006/0155865 A1 * | 7/2006 | Brandt et al. | 709/230 |
| 2006/0178760 A1 | 8/2006 | Mann et al. | |
| 2006/0259634 A1 | 11/2006 | Hood et al. | |
| 2006/0287746 A1 * | 12/2006 | Braithwaite et al. | 700/94 |
| 2007/0135947 A1 * | 6/2007 | Bromley et al. | 700/83 |

OTHER PUBLICATIONS

"Real-Time networks in Industrial Automation"—Richard H. Caro—2000 by Dedicated System Magazines—2000—Q2 (http://www.dedicated-systems.com) (pp. 61-64).*

European Search Report dated Mar. 29, 2004 for European Patent Application No. EP03026338, 3 pages.

Von Siegfried Staiger. Objektorientierte Planung und Abwicklung von Fertigungsauftragen, Geislingen/Steige, Oct. 1995.

Amnon Barak, et al., Performance of PVM with the MOSIX Preemptive Process Migration Scheme, Proc. 7th Israeli Conf. on Computer Systems and Software Engineering, Jun. 1996, 8 pages.

V. Ramesh, et al., A Methodology for Interschema Relationship Identification in Heterogeneous Databases, Proceedings of the 28th Annual Hawaii International Conference on System Sciences, 1995, 10 pages.

Wikipedia definitions for RDF and URI.

OA Dated Jun. 25, 2008 for US Appl. No. 11/065,953, 21 pages.

Bicley, et al. The Integration of two control systems. Proceedings of the Particle Acelarator Conference, 1995 vol. 4, May 1-5, pp. 2220-2222 vol. 4 Digital Object Identifier 10.1109/PAC. 1995.505504. http://epaper.kek.jp/p95/ARTICLES/MPA/MPA12.PDF. Last accessed Feb. 6, 2009, 3 pages.

Bonastre, et al. A new generic architecture for the implementation of intelligent and distributed control systems. IEEE 2002 28th Annual Conference of the Industrial Electronics Society (IECON 02), vol. 3, Nov. 5-8, 2002 pp. 1790-1795. http://ieeexplore.org/stamp/stamp.jsp?arnumber=1185242&isnumber=26591. Last accessed Feb. 7, 2009, 6 pages.

Capella, et al. A brigade crane advanced control system implemented by means of a distributed expert system. In: Proceedings Emerging Technologies and Factory Automation, 2003 (ETFA '03). IEEE Conference vol. 2, Sep. 16-19, 2003 pp. 347-353 vol. 2 Digital Object Identifier 10.1109/ETFA 2003-1248720.

Capella, et al. distributed and mobile systems based on wireless networks: Definition of a generic control architecture. International Conference on Industrial Technology, IEEE ICIT '04, vol. 2, Dec. 8-10, 2004, pp. 830-835 vol. 2 Digital Object Identifier 10.1109/ICIT.2004.1490182.

Decotignie, et al. Fulfilling Temporal Constraints in Fieldbus. International Conference on Industrial Electronics, Control and Instrumentation, 1993. Proceedings of the IECON'93, Nov. 15-19, 1993, pp. 519-524, vol. 1. DOI: 10.1109/IECON.1993.339022. http://ieeexplore.ieee.org/stamp/stamp.jsp?arnumber=339022&isnumber=7958. Last accessed Feb. 7, 2009, 6 pages.

Freeman. Achieving real-time Ethernet. Manufacturing Engineer, vol. 83, Issue 3, Jun.-Jul. 2004 pp. 14-15.

Furmanski, et al. Controller area network implementation in microwave systems. 14th International Conference on Microwaves, Radar and Wireless Communications, MIKON-2002, vol. 3, May 20-22, 2002 pp. 869-873 Digital Object Identifier 10.1109/MIKON. 2002. 1017975. http://ieeexplore.ieee.org/stamp/stamp.jsp?arnumber=1017975&isnumber=21906. Last accessed Feb. 7, 2009, 5 pages.

Garcia, et al. Reconfigurable Distributed Network Control System for Industrial Plant Automation. IEEE Transactions on Industrial Electronics, vol. 51, Issue 6, Dec. 2004 pp. 1168-1180. http://ieeexplore.ieee.org/stamp/stamp.jsp?arnumber=1360057&isnumber=29830. Last accessed Feb. 7, 2009, 13 pages.

Groza, et al. Cryptographic Authentication on the Communication from an 8051 Based Development Board over UDP. The Third International Conference on Internet Monitoring and Protection, ICIMP '08. Jun. 29-Jul. 5, 2008, pp. 92-97 Digital Object Identifier 10.1109/ICIMP. 2008.27. http://ieeexplore.ieee.org/stamp/stamp.jsp?arnumber=4561332&isnumber=4561311. Last accessed Feb. 7, 2009, 6 pages.

Gustavson, et al. The Scalable Coherent Interface (SCI). Communications Magzine, IEEE vol. 34, Issue 8, Aug. 1996 pp. 52-63 Digital Object Identifier 10.1109/35.533919. http://ieeexplore.ieee.org/stamp/stamp.jsp?arnumber=533919&isnumber=11187. Last accessed Feb. 7, 2009, 12 pages.

Hong, et al. Analysis of real-time data transmission in the DLL of IEC/ISA fieldbus. IEEE International Symposium on Industrial Electronics, 1998. Proceedings ISIE'98, vol. 2, Jul. 7-10, 1998, pp. 694-699. Digital Object Identifier 10.1109/ISIE. 1998.711706. http://ieeexplore.ieee.org/stamp/stamp.jsp?arnumber=711706&isnumber=15303. Last accessed Feb. 7, 2009, 6 pages.

Mossin, et al. Networked Control Systems Distance Learning: State of Art, Tendencies and a New Fieldbus Remote Laboratory Proposal. IEEE International Symposium on Industrial Electronics, ISIE 2007. Jun. 4-7, 2007 pp. 1870-1875, Digital Object Identifier 10.1109/ISIE. 2007.4374892. http://ieeexplore.ieee.org/stamp/stamp.jsp?arnumber=4374892&isnumber=4374555. Last accessed Feb. 7, 2009, 6 pages.

Sanz, et al. PCT: Component-based Process Control Testbed Decision and Control. European Control Conference, CDC-ECC '05, Dec. 12-15, 2005 pp. 1577-1582. http://ieeexplore.ieee.org/stamp/stamp.jsp?arnumber=1582383&isnumber=33412. Last accessed Feb. 7, 2009, 6 pages.

Song, et al. PEFP monitoring system through an Analog to Ethernet Convereter. Particle Accelerator Conference, IEEE, Jun. 25-29, 2007 pp. 287-289 Digital Object Identifier 10.1109/PAC.2007.4440.187. http://accelconf.web.cern.ch/AccelConf/p07/PAPERS/MOPAN059.PDF.

Wojzniz, et al. Neural network assisted control loop tuner. Proceedings of the IEEE International Conference on Control Applications, vol. 1, Aug. 22-27, 1999 pp. 427-431 vol. 1 Digital Object Identifier 10.1109/CCA.1999.806673.

Zwoll, et al. A Low Cost Local Area Network for Connecting Accelerator Equipment. IEEE Transactions on Nuclear Science, vol. 32, Issue 5, Part I, Oct. 1985 pp. 2077-2079. Digital Object Identifier 10.1109/ TNS.1985.4333820. http://ieeexplore.ieee.org/stamp/stamp.jsp?arnumber=4333820&isnumber=4333649. Last accessed Feb. 7, 2009, 3 pages.

OA Dated Aug. 27, 2008 for U.S. Appl. No. 11/067,164, 27 pages.

OA Dated Dec. 15, 2008 for U.S. Appl. No. 11/020,371, 56 pages.

OA Dated Dec. 29, 2008 for U.S. Appl. No. 11/764,702, 54 pages.

OA Dated Jan. 9, 2009 for U.S. Appl. No. 11/026,210, 16 pages.

OA Dated Nov. 18, 2008 for U.S. Appl. No. 11/065,953, 24 pages.

OA Dated Sep. 5, 2008, for U.S. Appl. No. 11/026,210, 40 pages.

Wikipedia Definition for "Protocol Stack" http://en.wikipedia.org/wiki/Protocol_Stack, last accessed on Jan. 8, 2009.

Wikipedia Definition for "Controller" http://en.wikipedia.org/wiki/Controller_%28_theory%29, last accessed on Jan. 8, 2009.

* cited by examiner

AUTOMATION DEVICE DATA INTERFACE

CROSS-REFERENCE TO RELATED APPLICATIONS

This application is a continuation-in-part of U.S. application Ser. No. 11/079,152, filed Mar. 14, 2005, and entitled "EMBEDDED APPLICATION MANAGEMENT IN INDUSTRIAL CONTROL SYSTEM." This application is also related to U.S. patent application Ser. No. 11/020,371 filed on Dec. 22, 2004 and entitled "INTEGRATION OF CONTROL AND BUSINESS APPLICATIONS USING INTEGRATION SERVERS," U.S. patent application Ser. No. 11/026,210 filed on Dec. 30, 2004 and entitled "DATABASE STORED PROCEDURE USED TO COLLECT CONTROL SYSTEM DATA," U.S. patent application Ser. No. 11/065,953 filed on Feb. 25, 2005 and entitled "TUNNELING FILE SYSTEM INTERFACE THROUGH NETLINX STACKS," and U.S. patent application Ser. No. 11/067,164, filed on Feb. 25, 2005 and entitled "RELIABLE MESSAGING INSTRUCTIONS," and U.S. patent application Ser. No. 11/141,527 filed on May 31, 2005 and entitled "APPLICATION AND SERVICE MANAGEMENT FOR INDUSTRIAL CONTROL DEVICES." The entireties of these applications are incorporated herein by reference.

TECHNICAL FIELD

The subject invention relates generally to industrial automation systems and more particularly toward data interaction and connectivity.

BACKGROUND

Industrial controllers are special purpose processing devices used for controlling (e.g., automated and semi-automated) industrial processes, machines, manufacturing equipment, plants, and the like. A typical controller executes a control program or routine in order to measure one or more process variables or inputs representative of the status of a controlled process and/or affect outputs associated with control of the process. Such inputs and outputs can be digital and/or analog. A typical control routine can be created in a controller configuration environment that has various tools and interfaces whereby a developer can construct and implement a control strategy using industrial and conventional programming languages or graphical representations of control functionality. Such control routine can be downloaded from the configuration system into one or more controllers for implementation of the control strategy in controlling a process or machine.

Measured inputs received from a controlled process and outputs transmitted to the process can pass through one or more input/output (I/O) modules in a control system. Such modules can reside locally or remotely from the controller. Inputs and outputs can be recorded in I/O memory. The input values can be asynchronously or synchronously read from the controlled process by one or more input modules and output values can be written directly to memory by a processor for subsequent communication to the process by specialized communications circuitry. An output module can interface directly with a controlled process by providing an output from memory to an actuator such as a motor, drive, valve, solenoid, and the like. During execution of the control routine, values of the inputs and outputs exchanged with the controlled process can pass through memory. Values of inputs in memory can be asynchronously or synchronously updated from the controlled process by dedicated and/or common scanning circuitry. Such scanning circuitry can communicate with input and/or output modules over a bus on a backplane or network and asynchronously or synchronously write values of the outputs in memory to the controlled process. The output values from the memory can be communicated to one or more output modules for interfacing with the process.

Industrial controllers can communicate with databases, for example to store and/or retrieve data. Conventionally, database communication is accomplished by continuously polling automation devices and sampling data to determine if the automation device includes data that needs to be written to a database. Alternatively, an application could wait to be messaged a controller indicating that it has data that should be retrieved and written to a database or that desires to obtain data from the database. An industrial protocol such as CIP (Control and Information Protocol) is conventionally employed to poll, message, retrieve and/or receive data from the automation layer, which is subsequently presented to a database. However, all transmissions such as reads and writes are limited by proprietary industrial control protocol (e.g., CIP—Control and Information Protocol) connection size (e.g., 512 bytes). Furthermore, all requests transmitted in an industrial protocol are first routed to an Ethernet card or box that converts the requests and transmits them to a database.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described, the subject invention concerns systems and methods to facilitate communication, interaction, and connectivity between industrial automation devices or systems and data supply systems or services. For example, the disclosed systems and methods can simplify reading and writing control system data to and from a database or interacting with a service.

In accordance with an aspect of the invention, an interface system is disclosed including a device interface component and a data interface component. The device interface receives commands, statements or other units of data or database interaction, including but not limited to declarative SQL statements, from an automation device such as an industrial controller and transmits the received statements to the data interface component. The data interface component subsequently transmits the statements to a database system for execution or evaluation and obtains a response. The response is then transmitted back to the data interface component, the device interface component, and ultimately to the automation device providing the statements. This enables automation devices to interact with a database in its native language (e.g., SQL, OQL, OOQL, MDX, . . . ), among other things.

In accordance with another aspect of the invention, the device interface component can obtain statements, commands, expressions in the form of protocol strings, for example, from one or more automation devices and transmit them to the data interface component. The data interface component can subsequently provide such statements to a service including but not limited to a network and web service for evaluation. Any results produced by the evaluation can subsequently be transmitted back to the one or more automation devices via the data and device interface components.

According to other aspects of the invention, the provided interface system can reside and execute as middleware, on a controller or other automation device, or on a database server.

According to an aspect of the subject invention, the device interface component can correspond to a socket based middleware application gateway including, for example, a BSD (Berkley Software Distribution) socket or Winsock. The socket can be open to send and receive statements, responses, and/or results through a middleware application communicatively coupled with JDBC drivers to a database, for example. This provides a raw data pipe between a control device and a database. Besides a socket interface, other middleware application interfaces include Common Industrial Protocol (CIP) object, web service interface, and reliable messaging such as JMS, MQTT, MSMQ, and MQ.

The data interface component can be implemented as a JDBC (Java Database Connectivity) connector or interface, in accordance with an aspect of the invention. Such an interface can facilitate communication with a database employing a database driver or API, thereby enabling the database to be updated, queried or otherwise manipulated in accordance with statements or commands received and transmitted thereto. The data interface component can also be implemented as a service connector to support interaction with services such as network and web services.

According to another aspect of the invention, an automation device such as a controller can include an interface system as well as database system. A controller can therefore act as a database serving information to other automation devices through as well as leverage the JDBC reliable messaging and/or inter-process communication to exchange information with upper layer information management systems including but not limited to MES (Manufacturing Execution System) or ERP (Enterprise Resource Planning).

According to another aspect of the invention, a mapping component can be employed to map native control code, variables, and/or tags, among other things, to stored data values. For example, the mapping can include one or more statements, commands, transactions, or other units of database interaction. The monitoring component can operate behind the scenes to automatically or semi-automatically update control code variables or tags, among other things, to ensure they mirror or alias particular stored data values or combinations thereof.

In accordance with still another aspect of the invention, methods are disclosed to facilitate communication with a database as well as a myriad of services. For example, statements or commands are received from an automation device such as a controller and transmitted to a database system or service for execution or evaluation. Subsequently, a response or result set can be received and transmitted back to the automation device.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION

Figure 1:
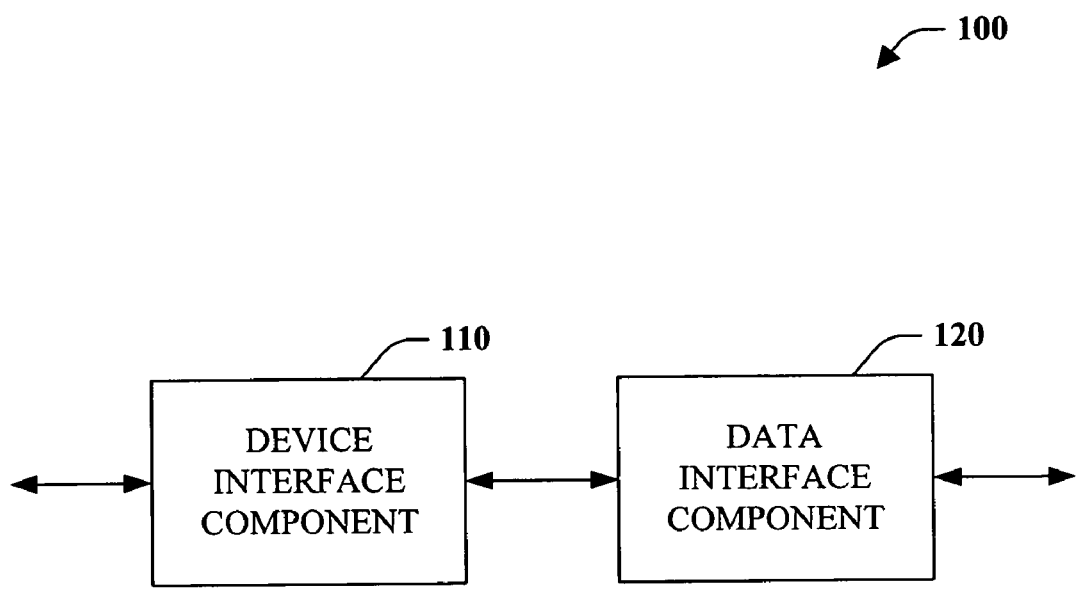
FIG. 1 is a block diagram of an interface system to facilitate data interaction in accordance with an aspect of the subject invention.

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the term "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the present invention may be implemented as a method, system, apparatus, or article of manufacture using standard programming and/or engineering techniques to produce software, firmware, hardware, or any combination thereof to control a computer or automation device (e.g., controller) to implement the disclosed invention. The term "article of manufacture" as used herein is intended to encompass a computer program accessible from any computer-readable device, carrier, or media. For example, computer readable media can include but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Artificial intelligence based systems (e.g., explicitly and/or implicitly trained classifiers) can be employed in connection with performing inference and/or probabilistic determinations and/or statistical-based determinations as in accordance with one or more aspects of the subject invention as described hereinafter. As used herein, the term "inference," or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Referring initially to FIG. 1, an interface system 100 is illustrated that facilitates data interaction in accordance with an aspect of the subject invention. More specifically, interface system can facilitate interaction between an automation device such as a controller and a database and/or a service (e.g., network, web . . . ). System 100 includes a device interface component 110 and a data interface component 120.

Device interface component 110 receives commands, statements, transactions or other unit of database or data interaction from one or more industrial automation devices. Database statements can include but are not limited to SQL (Structured Query Language) statements. Alternatively, multidimensional database statements such as MDX (Multidimensional Expressions), object-oriented database statements including OQL (Object Query Language), OOQL (Object-Oriented Query Language) or other statements or commands could be received depending on the structure and/or type of database involved in the interaction. The data statement(s) can be communicated to the device interface component via TCP/IP (Transmission Control Protocol/Internet Protocol) or like protocols, frameworks, inter-process communication (messages, queues, pub/sub, sockets, TIPC (Transparent Inter-Process Communication)) or communication models. Device interface component 110 can thus correspond to a socket, which enables communication between two different processes on the same or different machines. Here, device interface component 110 can be a socket that is in communication with one or more automation devices and stands prepared to receive and/or send data or data packets. Secure communications such as secure sockets layer (SSL) or other security means between a client and device interface component 110. Device interface component 110 is communicatively coupled to data interface component 120.

Data interface component 120 can receive or retrieve one or more statements, commands, transactions, or other unit of database or data interaction from the device interface component 110 and transmit them to a database management system (DBMS). Additionally, data interface component 120 can receive a response such as a result set from a database management system and transmit the response back to the device interface component 110. In accordance with an aspect of the invention, the data interface component 120 can be implemented utilizing JDBC (Java Database Connectivity) API (Application Programming Interface) for Java programs and a database driver associated with the database to be accessed. The driver is beneficial at least because it provides efficient and secure communication with a database. Component 120 may have a username and password or be provided one by a secure means. One aspect is to contain the authentication information in component 120, and not include IT layer, database usernames and passwords in a "zero" configuration interface component 110. Further, this architecture reduces revision management issues between the device interface component 110 and the database because the data interface component 120 contains the database JDBC driver.

Furthermore, the device interface component 110 can provide a mechanism to perform data filtering. In other words, the statements, transactions, or other units of database interaction received by the interface component 110 can be selectively and/or periodically provided to the data interface component 120 to facilitated efficient processing thereof. Rather than immediately transmitting every statement received, the interface component can batch them and transmit them to the data interface component at particular intervals or upon receipt of a predetermined number of statements, transactions or the like. The device interface component 110 can also include or employ artificial intelligence or knowledge or rule based components, systems, processes, means, or mechanisms (e.g., support vector machines, neural networks, expert systems, Bayesian belief networks, fuzzy logic, data fusion engines, classifiers . . . ) to aid in determining batch size as well as if an when to transmit the batch. The device interface component 110 can infer (as that term is defined herein) the optimal time and batch size to transmit to the data interface component 120. For example, the device interface component 110 could infer and/or detect database load and transmit batches at particular times when the database is available for processing.

For purposes of clarity and understanding and not limitation, consider a programmable logic controller (PLC) that seeks to write the some values to a database. The controller could transmit a native declarative database statement such as "INSERT INTO Table, values (10, 20, 30);" to the device interface component 110. The device interface component 110 could receive this statement and transmit it to the data interface component 120. Data interface component 120 could then transmit the statement to a database management system including but not limited to a relational database management system (RDBMS), object database management system (ODBMS) and Post-Relational Database. For example, such database management systems can correspond to, but are not limited to, DB2, MSSQL, MySQL, Informix, Sybase, Cloudscape, Oracle, Post-GRE, Versant, and Matisse. The database management system could then execute the statement thereby entering the values into the specified table. Upon completion, a response indicative of a successful write or an error can be transmitted back to the automation device, from the database management system through the data interface component 120 and device interface component 110 back to the PLC. This aspect of the subject invention enables the PLC programmer to have an efficient means to detect a successful database write, and the design assures them they no longer need to keep a duplicate copy of the data that now resides in the database.

It should be appreciated that although described in terms of sockets and JDBC, other implementations are also possible and within the scope of the subject invention. For example, the device interface component 110 can represent a CIP (Common Industrial Protocol) object(s) interface(s) that can enable both TCP and non-TCP/IP devices such as ControlNet and DeviceNet to exchange the data requests and communicate them to the data interface component 120. The interface object(s) can provide declarative interfaces as well as "pre-defined" interfaces such as an insert and/or select CIP service, as well as transparently map CIP data types to the datatypes supported by the database vendor (e.g., SQL). Further a CIP database table object can be mapped to a database table, such that this CIP object will then present a data schema, or data attributes which mirror the actual database table which it is assigned. In another example, both device interface component 110 and data interface component 120 can employ one or more of a combination of inter-process communication (IPC) mechanisms. In general, IPC can be employed to exchange data between processes, for example, within the same entity, over a network and/or throughout a distributed environment. IPC can also be utilized to enable one application to control another application, and/or for several applications to share the same data without interfering with one another. Examples of IPC mechanisms include, but are not limited to, Common Gateway Interface (CGI), Fast CGI, TIPC, Berkley sockets, std I/O such as stdin, stdout and stderr, file descriptors, named pipes, memory mapped files, queues and named queues, mailboxes, semaphores, shared or dual port memory, RISC OS messages, Mach ports, OS/2 named pipes, Microsoft Windows DDE, Novell SPX, Apple Macintosh IAC (e.g., AppleEvents) and/or different forms of software componentry, such as CORBA, Component Object Model (COM) and/or distributed COM (DCOM), and/or web services, and/or reliable messaging such as MSMQ, MQ, MQTT, and JMS.

Furthermore, while the interface system 100 is described herein with respect to interaction with database systems, system 100 is not so limited. The interface system 100 can facilitate interaction between an automation device or system and a myriad of different data sources or services. The device interface component 110 could receive strings, statements, expressions, or the like and interact with a data service via data interface component 120. For example, a device interface component 110 could receive a protocol string that specifies a network time to be received, retrieved, or otherwise obtained. The device interface component 110 could then transmit this string to the data interface component 120 that obtains the time from a network service. Similarly, interface system 100 and more particularly data interface component 120 can enable interaction with a web service.

Figure 2:
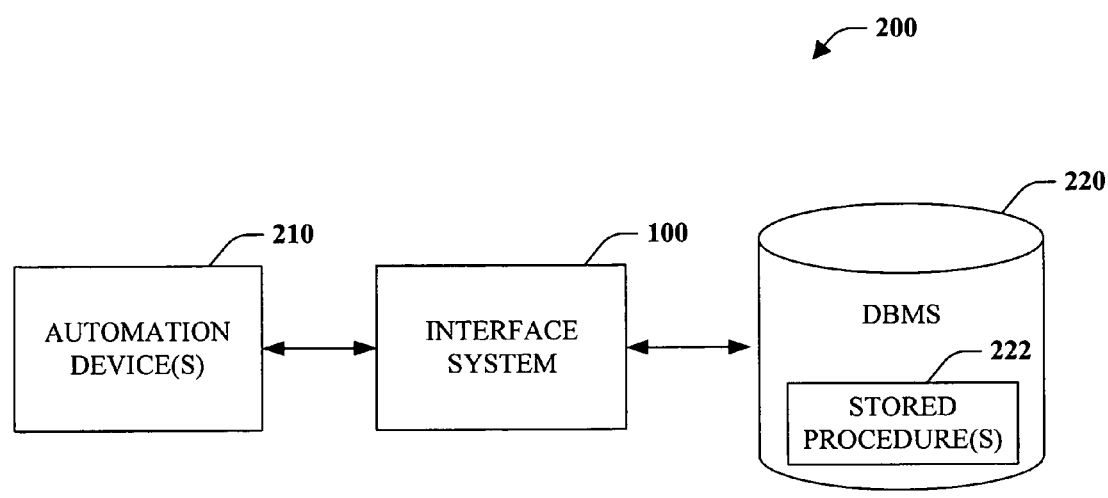
FIG. 2 is a block diagram of database communication system in accordance with an aspect of the subject invention.

FIG. 2 depicts a database communication system 200 in accordance with an aspect of the invention. System 200 can include one or more automation devices 210 an interface system 100 and a database management system 220. As presented, the interface system 100, described supra, can be implemented as middleware in accordance with an aspect of the subject invention. Accordingly, the interface system 100 can be provided between one or more automation devices 210 and one or more database management systems 220. Hence, interface system 100 can be embodied on a separate computer system or machine than either or both of the automation devices 210 and the database management system 220. Automation devices 210 can include programmable logic controllers (PLCs), control systems, modules, and any other components or systems that control and/or facilitate automation of industrial and/or manufacturing processes. The one or more automation devices 210 can generate and/or transmit declarative database statements, commands (e.g., SQL, OQL, OOQL, MDX . . . ), transactions (e.g., groups of statements or commands, which include Java Transaction API (JTA) and Transact-SQL), or other unit of database interaction to the interface system 100. Furthermore, it should be noted that the transmission of statements, commands and the like could be initiated remotely. For example, an operator could send a command to a controller from a remote personal computer, for example over the Internet, to send all its data, tags, objects, and the like to interface system 100 to persist such data. The interface system 100 can subsequently transmit the statements to database management system 220. Database management system 220 can subsequently send a response indicative of the success of the operation and/or a result set corresponding to the evaluated statement(s) to the interface system 100. Interface system 100 can then transmit the response and/or result(s) back to the one or more automation devices 210.

The results could be copied to PLC variables or further utilized in control logic code, for example. The PLC may asynchronously or synchronously copy the controller tags or other information to/from the declarative database statements in coordination with the control loops it is performing. Further, the controller can use special event processing tasks specifically designed to interface data with the database request responses events. Furthermore, it should be appreciated that database system 220 can include stored procedures. Accordingly, the one or more automation devices 210 can invoke one or more stored procedures utilizing statements transmitted via interface system 100. The PLC or other automation device 210 may store any type of information such as data, input/output discrete or process values or derived values, performance related information, alarms, events, messages, error logs, quality information, application programs, configuration information, recipe information, LDAP or active directory information, firmware images, etc. in the database system 220. Further, it should be appreciated that database system 220 is a general label that may include a singularity or plurality of database instances, as well as from various vendors and limited functionality source implementations performing a database function. The database system component 220 also is meant to include relational database management systems (RDBMS) and Object Database Management Systems (ODBMS)

Figure 3:
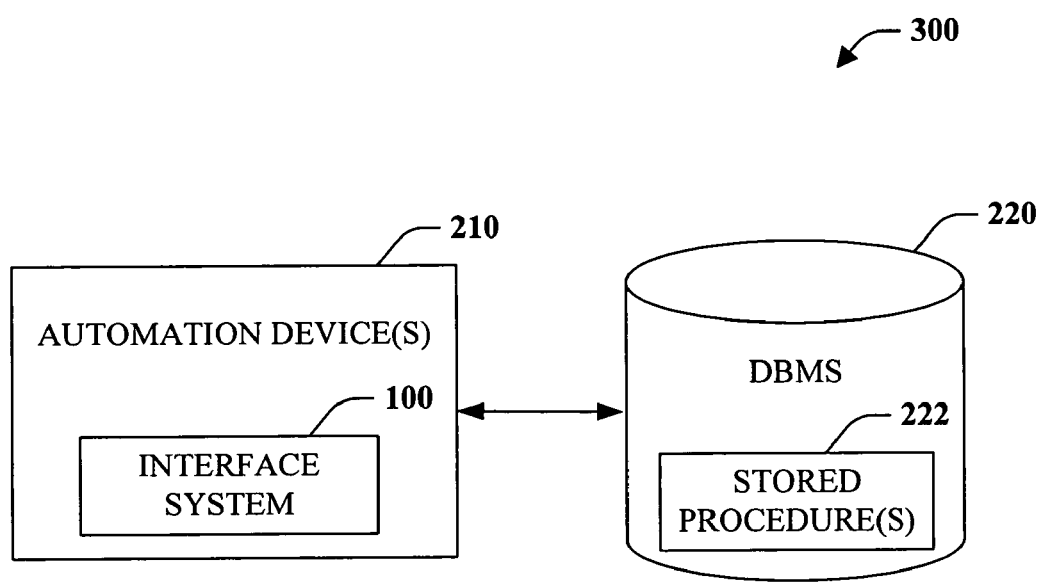
FIG. 3 is a block diagram of a database interaction system in accordance with an aspect of the subject invention.

FIG. 3 illustrates a database interaction system 300 in accordance with an aspect of the subject invention. Database interaction system 300 can include one or more industrial automation devices 210 and a database management system 220. According to this aspect of the invention, interface system 100 can reside on and be executed by an automation device 210 or control system component such as a PLC. The one or more automation devices 210 can generate a database statement, such as a SQL statement, command, or transaction. The statement, command or transaction can be received by the interface system 100 residing on one or more automation devices 210. The statements can then be communicated by the interface system 100 execution with respect to one or more automation devices to a database management system 220. The statements can then be executed or evaluated with respect to a database or data store. Furthermore, such statements could invoke one or more stored procedures 222 residing on the database system 220. A response including any results generated as a result of statement execution can be transmitted to the interface system 100 on one or more automation devices 210. The interface system can then supply the response or result set to the statement-issuing device 210.

Figure 4:
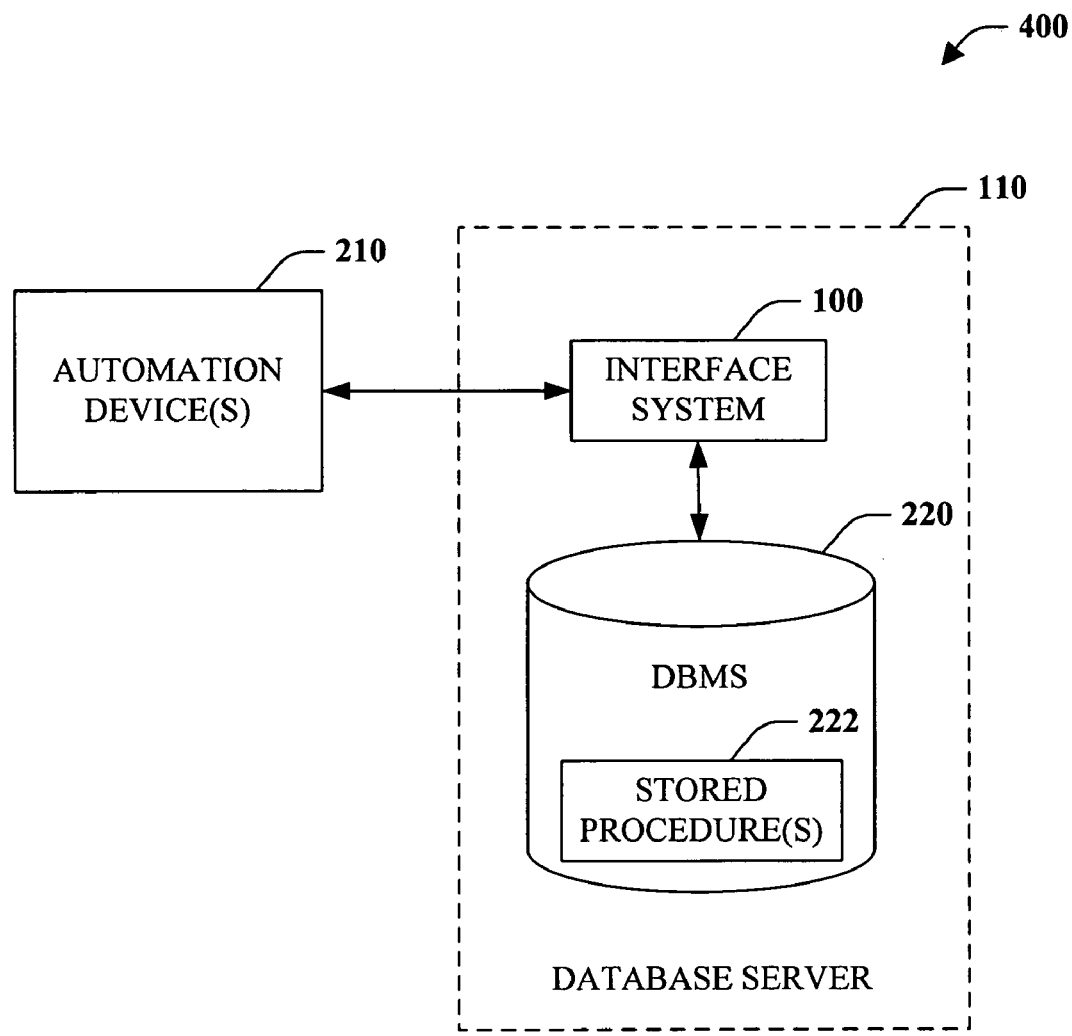
FIG. 4 is a block diagram of a database interaction system in accordance with an aspect of the subject invention.

FIG. 4 illustrates a database interaction system 400 in accordance with an aspect of the subject invention. System 400 includes one or more automation devices 210 and a database management system 220. According to this aspect of the invention, the interface system 100 can reside on database server 410 associated with the database management system 220 as a servlet, for instance. Hence, one or more automation devices 210 can communicate with the database system 220 via interface system 100. The interface system 100 can receive communications from the automation devices 210, for example utilizing TCP/IP data packets, reliable messages such as MSMQ, MQTT, MQ, JMS, or even via remote method invocation (RMI), via inter-process communication, web services, etc. An automation device 210 may or may not contain a username and password for the database. In this example, the database security credentials may be only contained in interface system 100, while a secure reliable communication technology like secure sockets layer (SSL), IP filtering, firewall, ingress and/or egress filtering, or IP security protocol (IPsec) is leveraged between system 100 and device 210. However, this does not exclude the option of the automation device authenticating against an authentication proxy, or the database by any viable means including but not limited to username, password, and digital certificate. The interface system 100 can subsequently transmit the database statements, commands, or transactions to the database management system 220 for processing or evaluation. The database system 220 can also include stored procedures 222. Hence, it should be appreciated that the received database statements can invoke such stored procedures 222. The database system 220 can subsequently return a response such as a result set corresponding to the database statements and/or an indication that statement execution was successful or in error. The response and/or results can be transmitted to the interface system 100, which can provide such data back to one or more automation devices 210.

Figure 5:
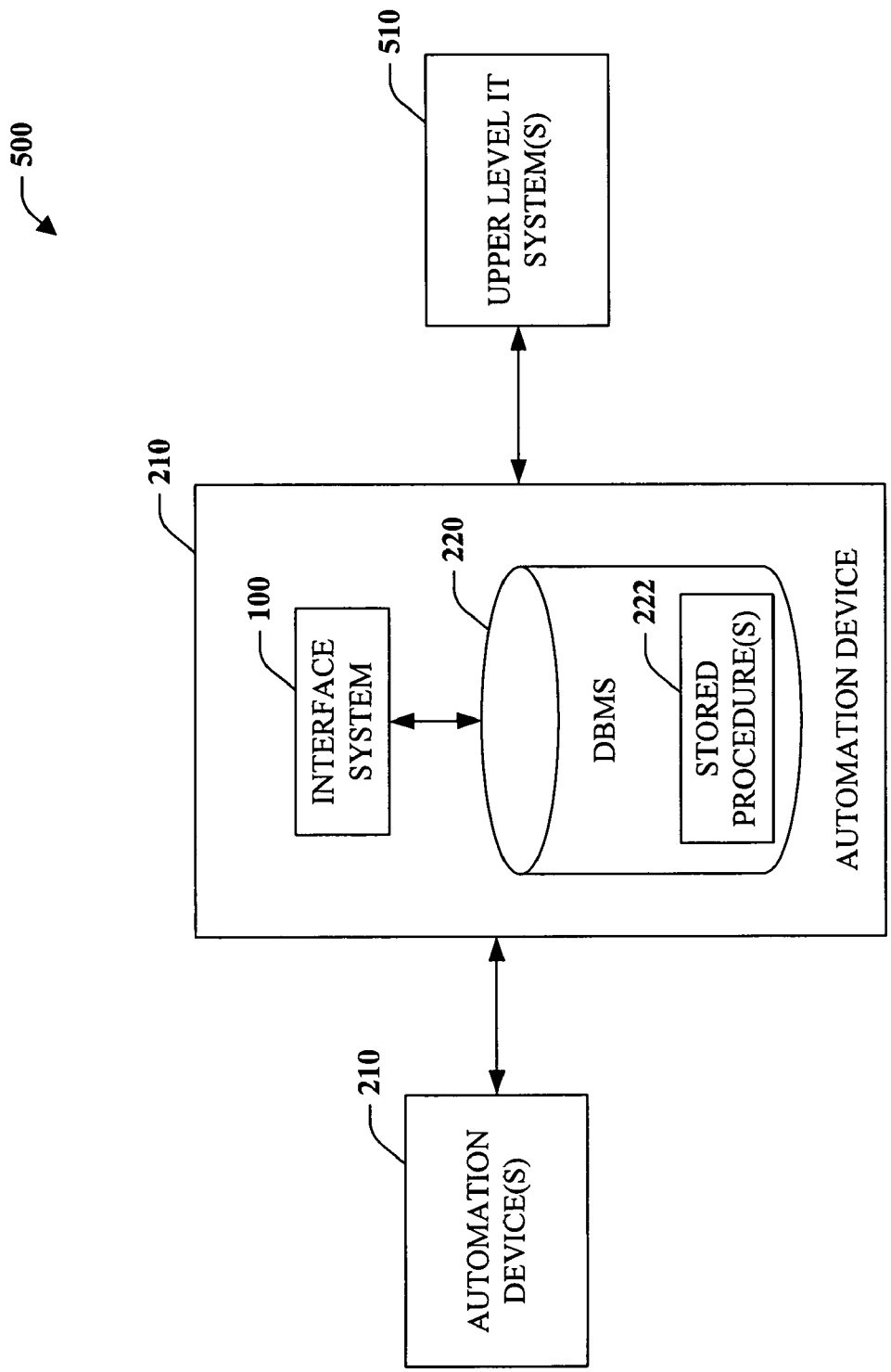
FIG. 5 is a block diagram industrial automation system in accordance with an aspect of the subject invention.

FIG. 5 illustrates a system 500 in accordance with an aspect of the subject invention. System 500 includes an automation device 210 that comprises interface system 100, database system 220 and optional stored procedures 222. System 500 enables at least one automation device 210 such as a controller to also act as a database serving information to other automation devices 210 through as well as leverage the JDBC reliable messaging and/or inter-process communication to exchange information with upper layer IT systems including but not limited to MES (Manufacturing Execution System) or ERP (Enterprise Resource Planning) shown by component 510. The local database system or component 220 may also act as a data cache between the large ERP and MES databases (not shown). This enables a PLC controlling a manufacturing line to buffer work in progress when network connectivity or availability of the ERP/MES servers is interrupted.

The automation data, control variables, and tags may be mapped between a database 220 and the actual device internal values transparent to the user. Hence, a remote ERP/MES client or system 510 can make a syntactically correct SQL declarative statement such as select from a Table where VIN_ID=123456, which could return a result set containing the build parameters for a vehicle with vehicle VIN ID=123456. Similarly, the ERP/MES system 510 could now modify this vehicle's color from blue to red by executing a SQL statement such as "UPDATE TABLE SET COLOR="RED" WHERE VIN=123456, rather than try and find the PLC data value in an array of strings, etc, as is the current convention. This is possible because the build parameters may actually be stored in a local database, the PLC variables and tags can be mirrored in the local database, or the PLC leverages the interface component 100 to fetch the latest build parameters just in time (e.g., in real time) for that specific control loop when it performs the vehicle's painting. System or component 510 can represent a single instance of or a plethora of upper layer MES and ERP IT systems such as SAP, Oracle, IBM WebSphere and/or Server Foundation, Microsoft, webMethods Integration Servers, and other database, quality and information management systems. Further, it should be appreciated that the interface system 100 supports moving information between the automation device and the database as a transaction.

Figure 6:
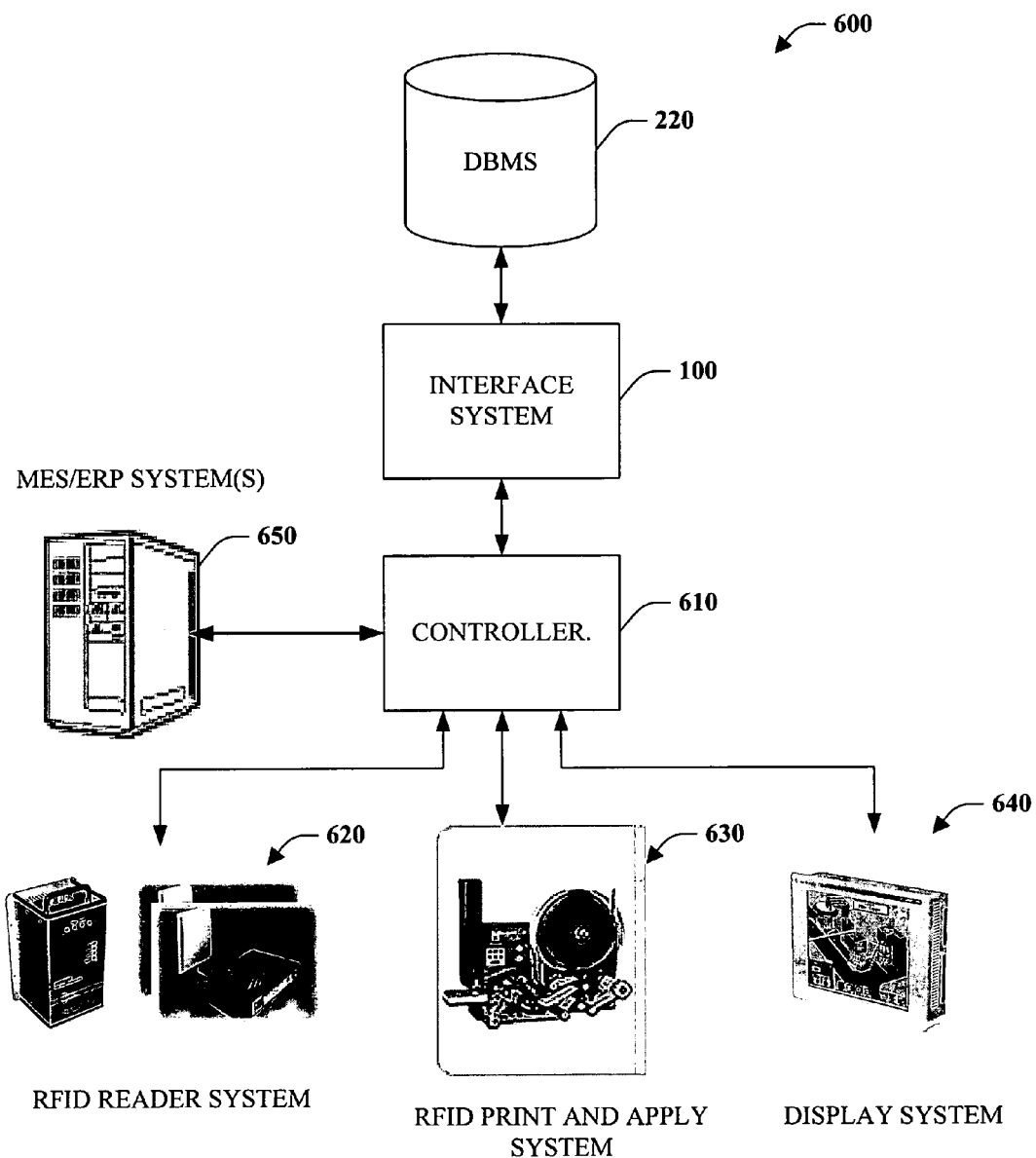
FIG. 6 is a diagram illustrating an exemplary system employing aspects of the subject invention.

Turning to FIG. 6, an exemplary system 600 is depicted to illustrate how aspects of the invention can be employed in an industrial automation environment. It should be appreciated that system 600 is provided to facilitate understanding of aspects of the invention and not to limit the scope thereof. System 600 includes a database management system or data warehouse system 220 (e.g., Oracle, MSSQL, MySQL, DB2, Access, Versant, Post-GRE, Matisse . . . ). System 600 also includes a controller 610 such as a programmable logic controller (PLC) or other control system. The controller 610 interacts with the database system employing an interface system 100 as described with respect to FIG. 1. The controller can also interact with a plurality of automation systems including RFID (Radio Frequency Identification) reader 620, RFID print and apply system 630, display system 640. The controller 610 can receive data from an RFID reader system 620 and store such data to the database 220 utilizing the interface system 100. For instance, the controller 610 can collect batches of data and employ declarative query commands or statements specifying the storage and/or organization of the data with respect to a database. Additionally, the controller 610 can retrieve data from the database system 220 via interface system 100, and provide such data to a RFID print and apply system 630 to enable generation of RFID tags, for example. The controller could also retrieve and supply data from the database system 220 to the display system 640 to enable population of user interfaces or displays with data as well as respond to requests and/or commands from users. Still further yet, the controller 610 can interact with MES/ERP (Manufacturing Enterprise System/Enterprise Resource Planning) systems 650 (e.g., SAP, IBM Web Sphere, MRF-PRO . . . ). Such systems are business management systems that provide a plurality of tools and applications with respect to all facets of business including but not limited to sales, manufacturing, marketing, planning, inventory control, and order tracking. Controller 610 can provide an uplink of data such as RFID data to the MES/ERP system 650 from database system 220 utilizing interface system 100.

Figure 7:
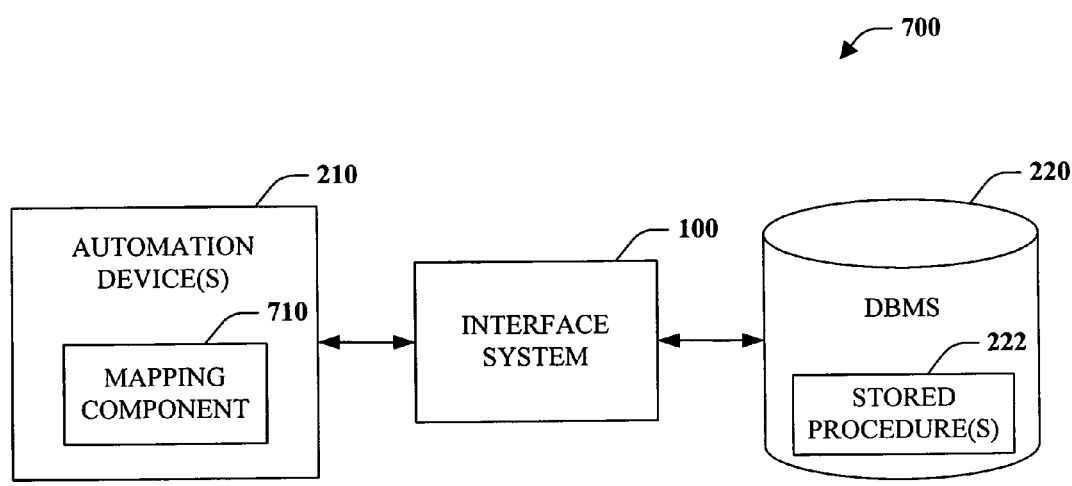
FIG. 7 is a block diagram of a database interaction system in accordance with an aspect of the subject invention.

FIG. 7 depicts a database interaction system 700 in accordance with an aspect of the subject invention. System 700 can include one or more automation devices 210 an interface system 100 and a database management system(s) 220. As described throughout, the interface system 100 facilitates communication between automation devices or components and a database system. As illustrated, interface system 100 resides between automation device(s) 210 and database management system 220 as provided in system 200 of FIG. 2. However, it should also be appreciated that interface system 100 can also be located on an automation device 210, on the a database server, or together with a database system on an automation device 210 as described with respect to systems 300, 400, and 500 of FIGS. 3-5, respectively, among other orientations. Furthermore, the database management system 220 may include one or more of a relational database management system (RDBMS) and object database management system (ODBMS), amongst other data management systems. Automation devices 220 can include programmable logic controllers (PLCs), control systems, modules, and any other components or systems that control and/or automate industrial or manufacturing processes. The one or more automation devices 210 can generate and/or transmit declarative database statements, commands (e.g., SQL, MDX . . . ), transactions (e.g., groups of statements or commands), or other unit of database interaction to the interface system 100. The interface system 100 can subsequently transmit the statements to database management system 220. Database management system 220 can then send a response indicative of the success of the operation and/or a result set corresponding to the evaluated statement(s) to the interface system 100. Interface system 100 can then transmit the response and/or result(s) back to the one or more automation devices 210. Furthermore, it should be appreciated that database system 220 can include stored procedures. Accordingly, the one or more automation devices 210 can invoke one or more stored procedures utilizing statements transmitted via interface system 100.

System 700 also includes a mapping component 710. Mapping component 710 can map java objects, automation device variables, tags, data, and the like to stored or persisted data, for example via one or more database statements, commands, transactions or other units of database interaction. More specifically, the mapping component 710 can include or be communicatively coupled to a plurality of rules or a schema that can be employed to perform the mapping or aliasing. Further, this mapping component can perform the relational to/from object database mapping (R/O Mapping). The automation devices 210 may persist objects data in the object database. A mapping component may relate these databases between each other and remote databases. The automation layer configuration, programming, and devices may include and/or leverage object/relational mapping tools such as CocoBase by Thought, Inc. Hence, the mapping component could receive a variable or tag and map it to one or more corresponding statements, commands, queries, or the like. The statements can then be transmitted via the interface system 100 to the database system 220 for evaluation or execution. The results of the evaluation can be provided to the mapping component 710 utilizing interface system 100. It should also be appreciated the results of these statements could be fetched from memory such as local cache, if available, or alternatively from a web service or inter-process communication. The mapping component 710 can then copy the results to the appropriated variables or tags or otherwise utilize the results in control logic code.

The data flow between the automation device 210 and database system 220 can thus be performed transparently to a programmer. For instance, control tags can be configured, mapped, linked or aliased to a database value, row, table, or stored procedure, such that when the user or other entity utilizes the automation alias they are in effect operating through interface system 100 without having to be explicit about the data movement. The data exchange occurs according to the mapping rules, such as use of a local cache, involve inter process communications, rule based such as periodic update, dead band, change of state, trigger synchronous and asynchronous updates, etc. Furthermore, such mirroring or aliasing of control system variables, tags, or the like can be done automatically or semi-automatically by mapping component 710.

By way of example and not limitation, consider a situation where a programmable logic controller includes an addition command such as add ($z=x+y$), where z, x, and y are all integers. The mapping component could receive this command and map x to the query statement "Select weight From IngredientsTable Where type=flour" and map y to the statement "Select weight From LiquidTable Where type=water." These query statements could then be submitted for evaluation (if not available in cache) to the database system 220 utilizing interface system 100. The results of the statements could then be returned to the mapping component, which could add the values together to determine the value of z. Subsequently, a PLC SQL instruction can utilized to perform an update such as "Update totalweight From OutputTable Set totalweight=z Where batch=1234." Thus, from this example it should be appreciated that control logic can include or directly reference declarative database statements, commands, and the like as well as employ such statements indirectly through mapping component 710 or any combination thereof. Further, local data tags that are references or aliases for a local database value may be updated by a remote client. In this case, a PLC controller or automation device is using a data value that may actually be distributed to multiple devices, and updated or managed by a central server.

The aforementioned systems have been described with respect to the interaction between several components and/or systems. It should be appreciated that such systems can include those components and/or systems specified therein, some of the specified components, and/or additional components specified in other systems. Additionally, it should be noted that one or more components may be combined into a single component to provide aggregate functionality or divided into several subcomponents. The components may also interact with or be integrated with one or more other components or systems not specifically described herein but known by those of skill in the art.

In view of the exemplary systems described supra, a methodology that may be implemented in accordance with the subject invention will be better appreciated with reference to the flow charts of FIGS. 8-12. While for purposes of simplicity of explanation, the methodology is shown and described as a series of blocks, it is to be understood and appreciated that the subject invention is not limited by the order of the blocks, as some blocks may, in accordance with the subject invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as defined supra, is intended to encompass a computer program accessible from any computer-readable device, carrier, or media.

Figure 8:
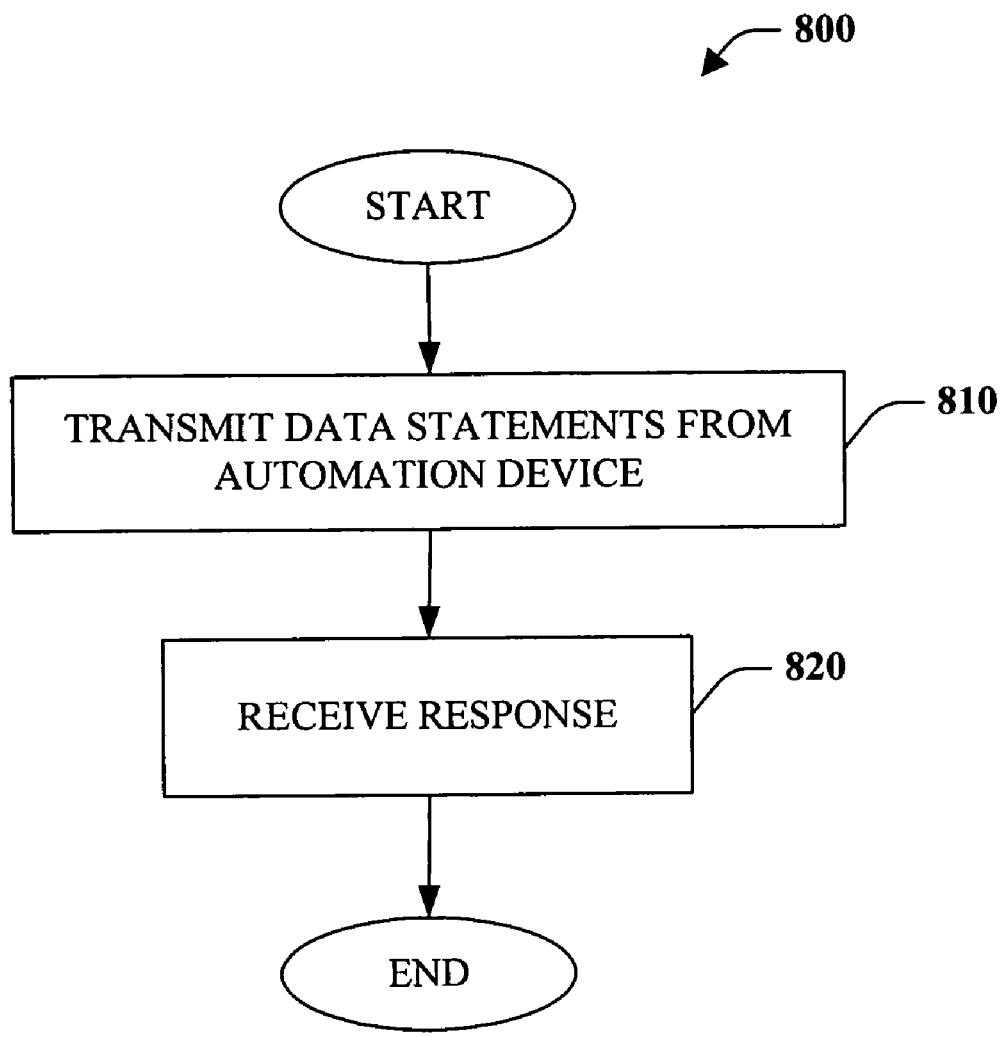
FIG. 8 is a flow chart diagram of a data interaction methodology in accordance with an aspect of the subject invention.

Turning to FIG. 8, a method of data interaction 800 is illustrated in accordance with an aspect of the subject invention. At reference numeral 810, one or more database statements, commands, transactions, or other unit of database or data interaction are transmitted from an automation device such as a controller to a database, database management system, data warehouse system or other system or service. Such statements can be declarative database statement such SQL or OQL statements, specified in string variables, for instance. Such statements can specify storage of data and/or retrieval of data. Furthermore, such statements can invoke one or more stored procedures. These database statements can be transmitted utilizing a protocol such as TCP/IP and the like. Initiation of the transmission can be local or remote. For example, a controller could receive a command to persist all its data, objects, tags, and the like to a database. At 820, the automation device receives a response. The response can include an indication of whether or not execution of the statement(s) was successful and/or a result set. Subsequently, the result set can be copied to some controller variable to effect operation of some device or otherwise utilized in programmatic logic (e.g., ladder logic . . . ).

Figure 9:
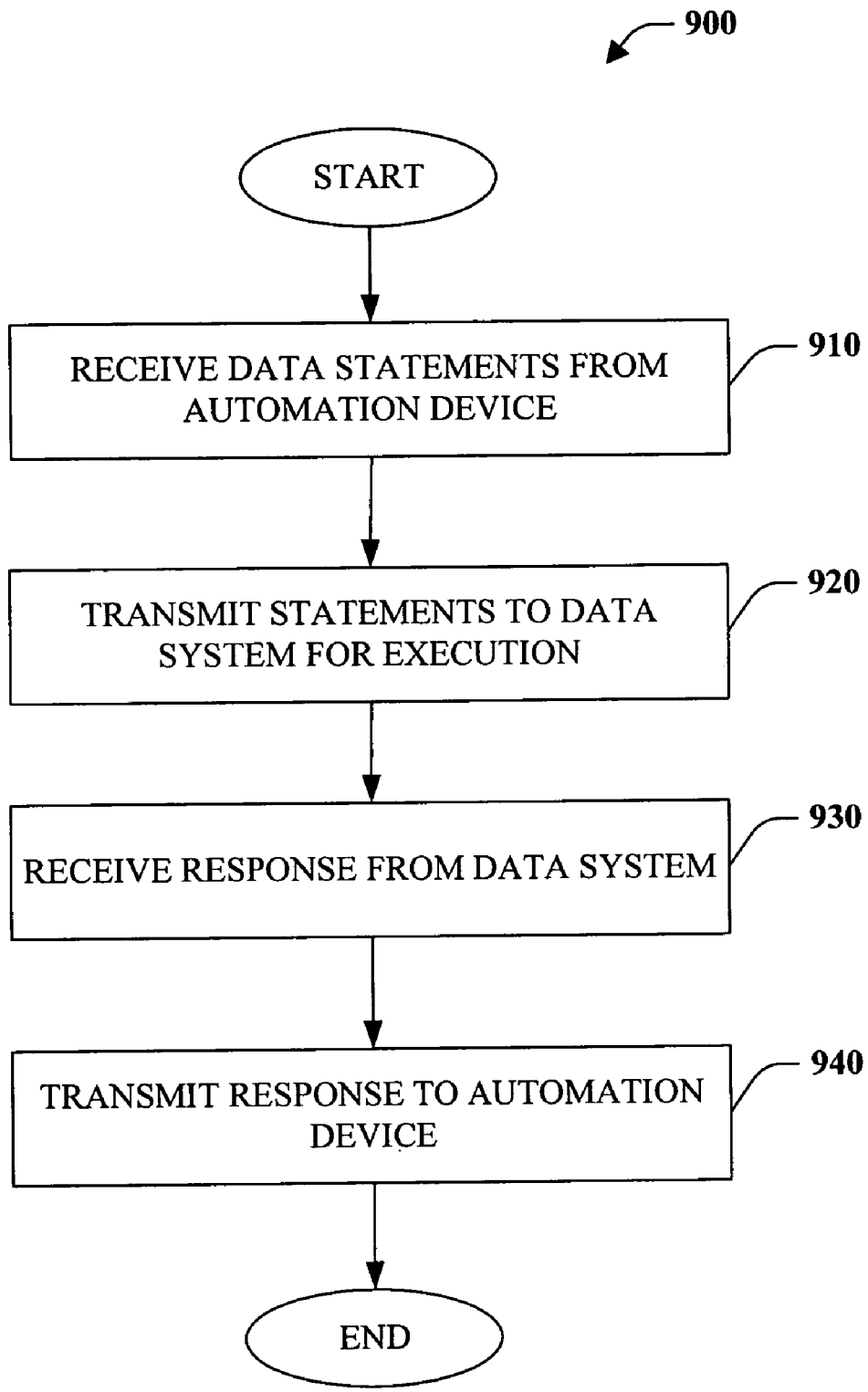
FIG. 9 is a flow chart diagram of a method of facilitating interaction between automation devices and data systems in accordance with an aspect of the subject invention.

FIG. 9 is a flow chart diagram illustrating a method 900 of facilitating communication between automation devices and data systems. At reference numeral 910, one or more database statements, commands, transactions, or other units of database or data interaction are received from an automation device. The statement can be a declarative statement such as a SQL statement or the like. Furthermore, the statement can provide for storage of data to a data system such as a database, retrieval of data, and/or manipulation of stored data. Still further yet, the statements can reference and invoke stored procedures. At 920, the received statement(s) are transmitted to a data system such as a database (e.g., DB2, MSSQL, MySQL, Oracle, Versant, Post-GRE, Matisse . . . ) or service for execution or evaluation. Statements can be transmitted to a database employing a database driver or application programming interface (API). Furthermore, database connectivity systems, interfaces, or connectors can be employed including but not limited to JDBC (Java Database Connectivity), ODBC (Open Database Connectivity), Java Transaction API (JTA), reliable messaging (IBM Websphere MQ, Microsoft Message Queuing (MSMQ), MQ Telemetry Transport (MQTT), Java Messaging Specification (JMS)), and web services. Automation data values may be persisted by object database management systems, and data files. Automation data contained in Java objects may leverage known as Plain Old Java Object (POJO) persistence model, Java Data Objects (JDO) as defined by the Java Specification Requests i.e. JSR-000012, JSR-243, etc. At 930, a response to the statement(s) is received from the data system. The response can be an indication of successful execution or an error and/or a result set. The response can then be transmitted back to an automation device, at 940.

Figure 10:
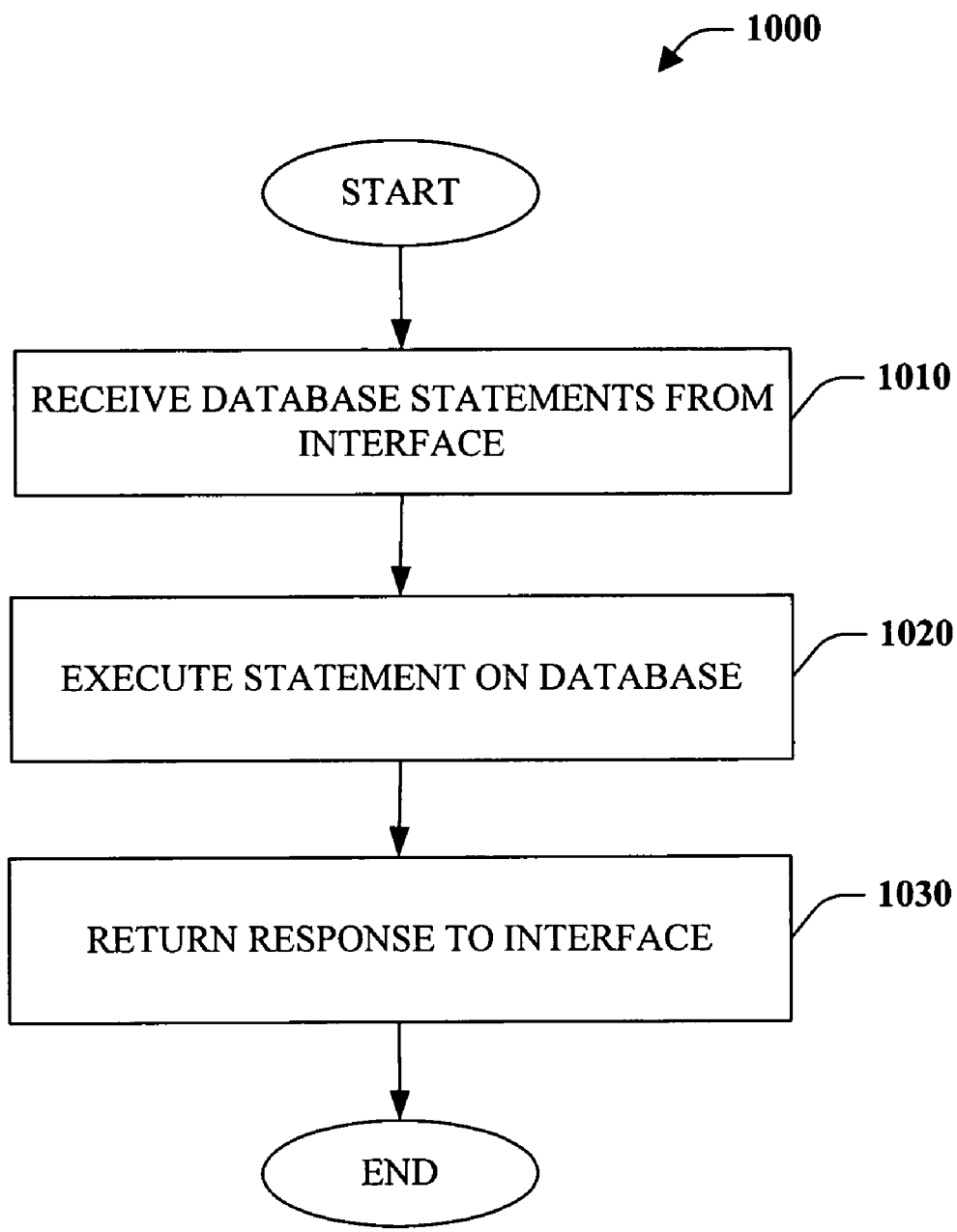
FIG. 10 is a flow chart diagram of a database interaction methodology in accordance with an aspect of the subject invention.

FIG. 10 depicts a database interaction methodology 1000 in accordance with an aspect of the subject invention. At reference numeral 1010, database statements, commands, transactions, or other unit of database interaction are received from an interface. The statements can be declarative database statements, for example in a structured query language (e.g. SQL, MDX . . . ). Such statements can seek to add data, amend data, or retrieve data from a database. At 1020, the database statements are executed or evaluated. For example, values are inserted into a table, modified, and/or retrieved. At 1030, a response is returned to the interface. The response can include an indication as to whether the statement(s) was able to be executed. Furthermore, the response can include a results or a result set, for example if the statement(s) include a data query. A similar methodology can be employed with respect to services such as webs services.

Figure 11:
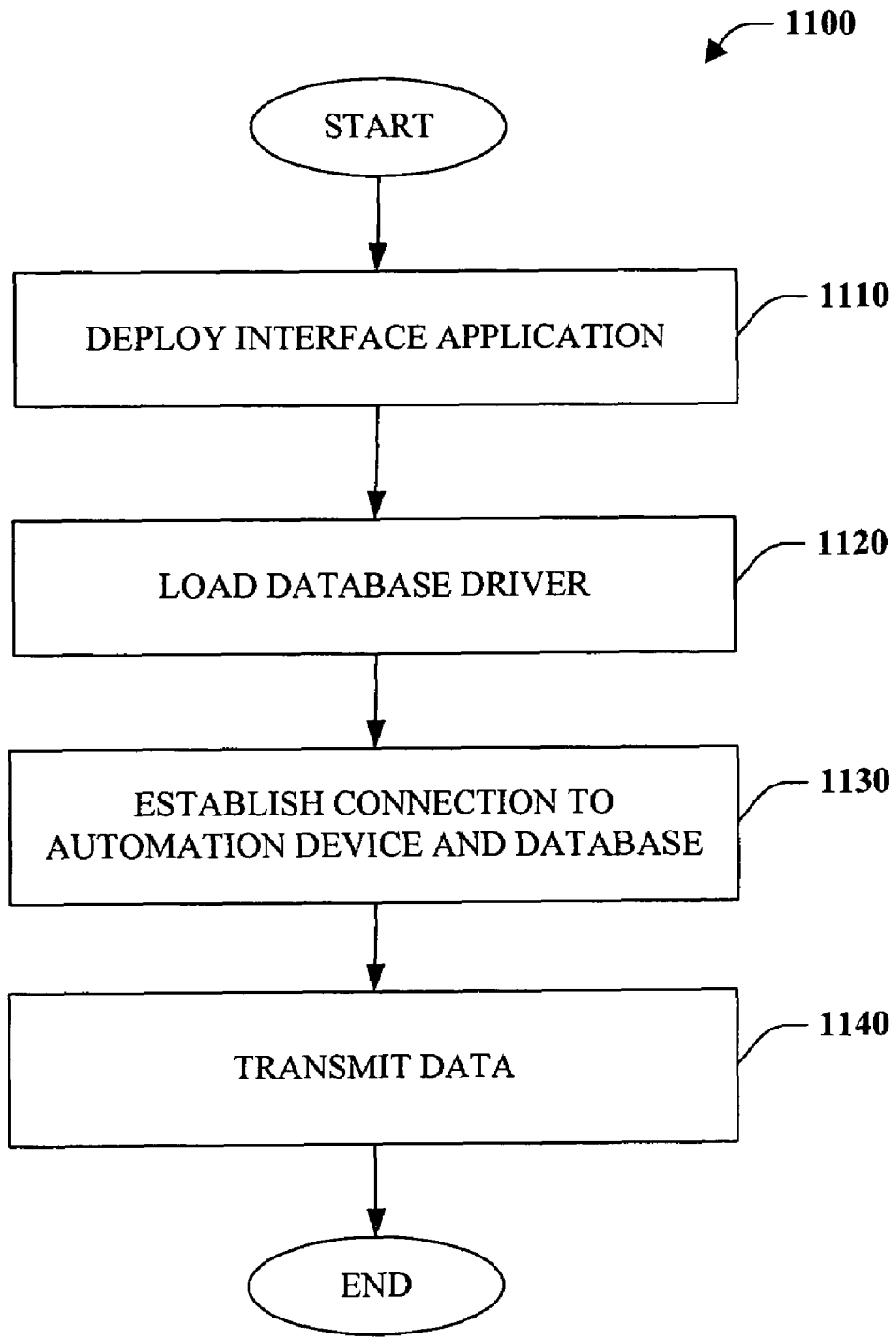
FIG. 11 is a flow chart diagram of a method of database interaction in accordance with an aspect of the subject invention.

FIG. 11 illustrates a method of database interaction 1100 in accordance with an aspect of the subject invention. At reference numeral 1110, an interface is deployed. The interface can include the interface system 100 as described above. Such an interface can be deployed as middleware on a machine separate from the automation device and a database system, on the automation device, or on a database system server. At 1120, a database driver or API (Application Programming Interface) is loaded to facilitate communication with a specific database and/or a particular database vendor (e.g., DB2, MSSQL, MySQL, Oracle, Versant, Post-GRE, Matisse . . . ). Such drivers or database vender APIs are advantageous at least because they provide for efficient and secure communication with a database. At 1130, connections are established between the interface and one or more automation devices, and the interface and a database. Once the connections are established, the interface is operable to facilitate communication between one or more automation devices and a database. At 1140, data is transmitted via the interface from automation devices to the database and/or from the database to the automation devices. For example, the automation device can issue database commands or statements, for example, which are transferred to the database utilizing the interface for execution or evaluation. Responses including but not limited to query result sets can be returned to one or more automation devices from the database via the interface.

Figure 12:
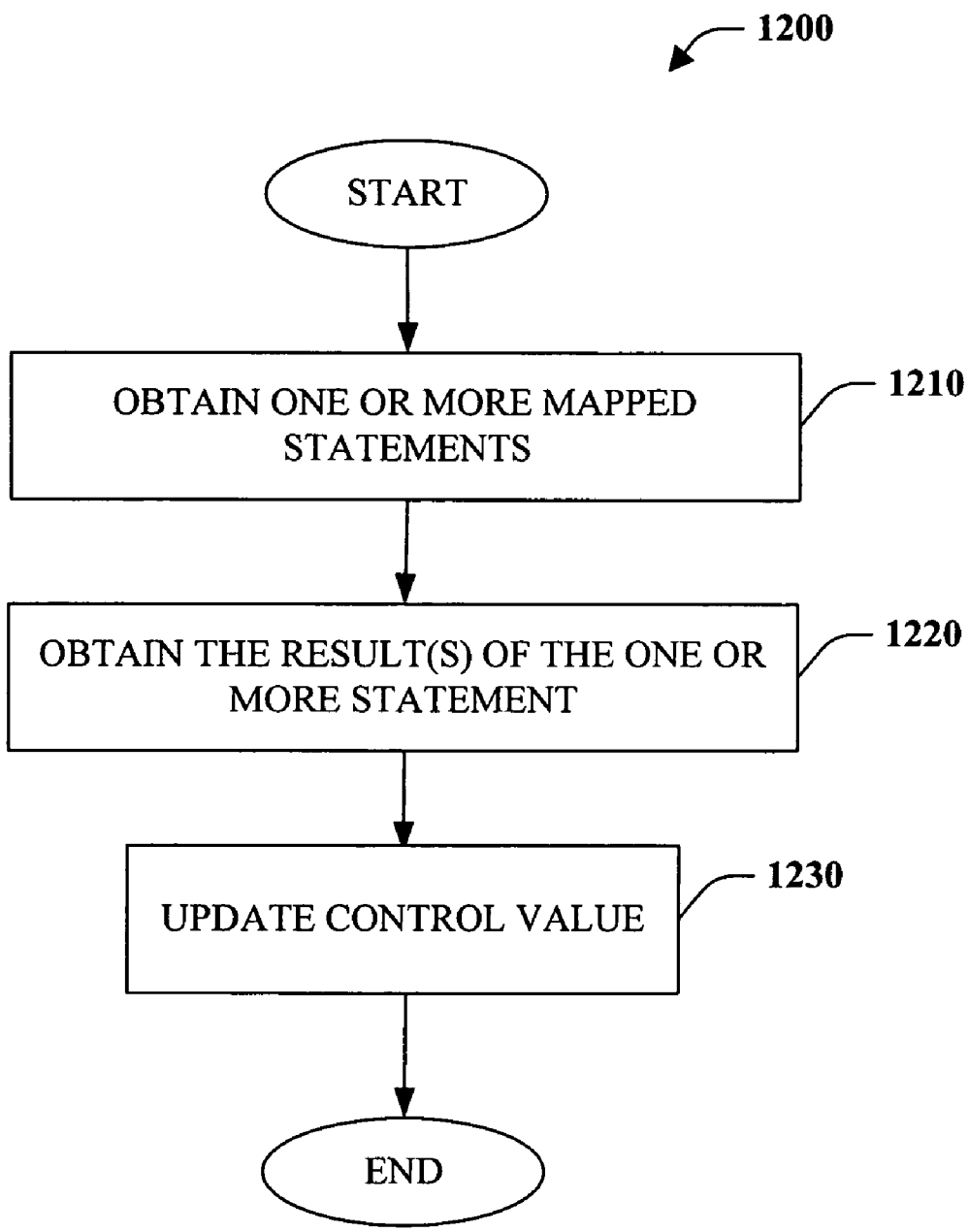
FIG. 12 is a flow chart diagram of a data interaction methodology in accordance with an aspect of the subject invention.

FIG. 12 depicts a method of data interaction 1200 in accordance with an aspect of the subject invention. At reference numeral 1210, one or more mapped statements, commands or the like are obtained. The mapped statements can correspond to declarative database systems such as a SQL or OQL statement, command, or query. At 1220, the result(s) of such statements can be obtained. The result(s) could be obtained from a database, a web service, or an inter-process communication, among other things. For example, the mapped statement could be transmitted via an interface system as described herein to a database system. The database system could evaluate the statement and provide results. Alternatively, the results could be fetched from a local cache or memory and fetched from the database only when the result is not already in memory. At 1230, control values can be updated. For example, control variables or tags can be updated with the obtained result value(s). Additionally or alternatively, the result(s) could simply be employed further in control logic.

Figure 13:
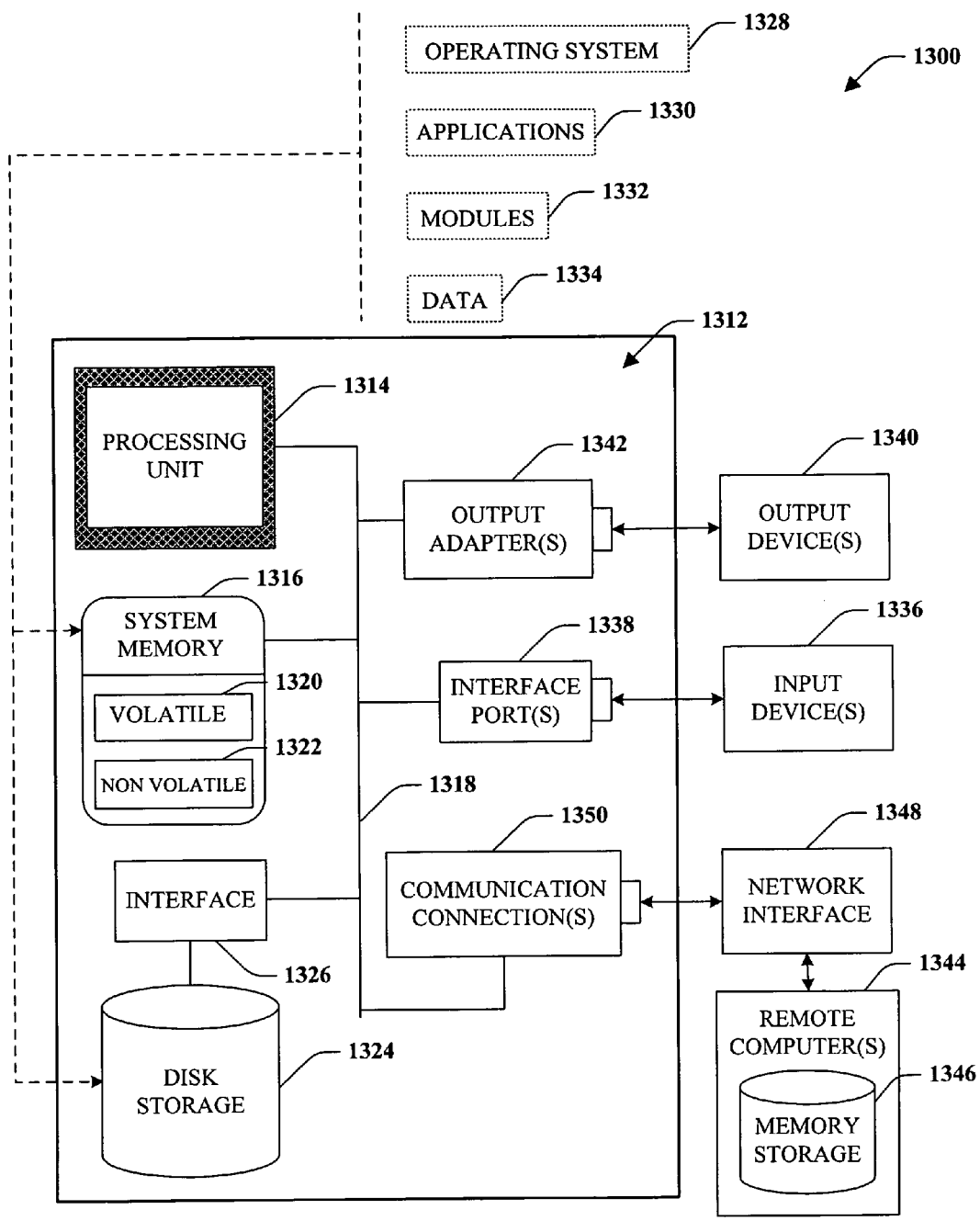
FIG. 13 is a schematic block diagram illustrating a suitable operating environment in accordance with an aspect of the present invention.
Figure 14:
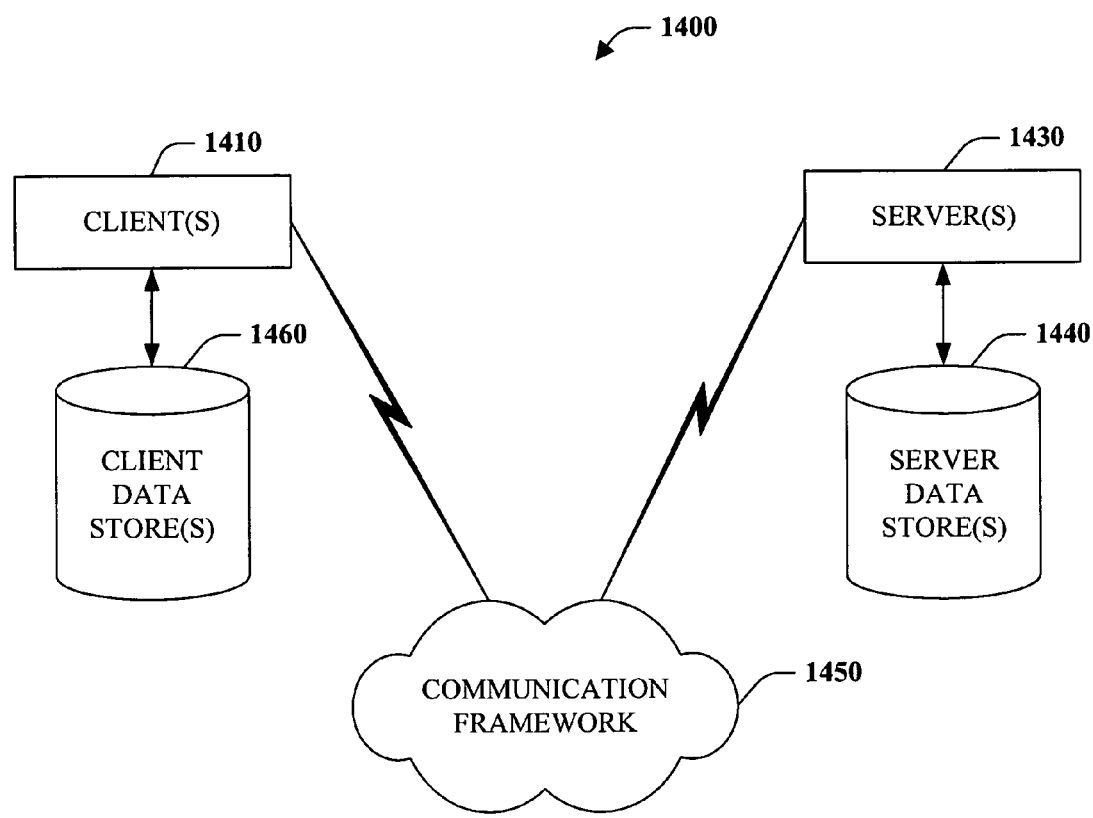
FIG. 14 is a schematic block diagram of a sample-computing environment with which the present invention can interact.

In order to provide a context for the various aspects of the invention, FIGS. 13 and 14 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, industrial controllers, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 13, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example disk storage 1324. Disk storage 4124 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the present invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312 and to output information from computer 1312 to an output device 1340. Output adapter 1342 is provided to illustrate that there are some output devices 1340 like displays (e.g., flat panel and CRT), speakers, and printers, among other output devices 1340, that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems, power modems and DSL modems, ISDN adapters, and Ethernet cards.

FIG. 14 is a schematic block diagram of a sample-computing environment 1400 with which the present invention can interact. The system 1400 includes one or more client(s)

1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The server(s) 1430 can house threads to perform transformations by employing the present invention, for example. One possible communication between a client 1410 and a server 1430 may be in the form of a data packet transmitted between two or more computer processes. The system 1400 includes a communication framework 1450 that can be employed to facilitate communications between the client(s) 1410 and the server(s) 1430. The client(s) 1410 are operatively connected to one or more client data store(s) 1460 that can be employed to store information local to the client(s) 1410. Similarly, the server(s) 1430 are operatively connected to one or more server data store(s) 1440 that can be employed to store information local to the servers 1430.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A computer-implemented system to facilitate interaction between automation devices and database systems or services comprising following components stored in a computer memory of the system:
   a device interface component, resident at the automation device, that receives one or more statements from one or more automation devices, wherein the device interface component is a Common Industrial Protocol object interface that receives Common Industrial Protocol objects that map to database statements;
   a data interface component, resident at the automation device, that receives the statements from the device interface component and transmits the statements to a database, the database executes the statements and returns a response, indicating a result of execution of the statements at the database, to the automation device through the data interface component and the device interface component to facilitate interaction between the automation devices and the database;
   wherein the database executes the statement by entering values into a specified table and returns the response indicative of a successful write or an error, to the automation device, from the database through the data interface component and the device interface component.

2. The system of claim 1, further comprising a database system that receives the statements from the data interface component and executes the statements on a database.

3. The system of claim 2, the database system returns a response including at least one of an indication of whether the statements were successfully executed and a result set that satisfies the one or more statements.

4. The system of claim 2, the device interface component receives declarative database statements from the one or more automation devices.

5. The system of claim 1, the one or more automation devices communicate with the device interface component via Transmission Control Protocol/Internet Protocol.

6. The system of claim 1, the data interface component communicates with a database via a Java Database Connectivity connector.

7. The system of claim 1, the data interface component communicates with a database via one of an Open Database Connectivity connector and a web service connector.

8. The system of claim 1, the data interface component includes a database driver to enable communication with a particular database.

9. The system of claim 1, the device interface component provides an open socket connection to the one or more automation devices.

10. The system of claim 1, the device interface component and the data interface component are part of one of a server application, a middleware application, and an automation device application.

11. The system of claim 1, the device interface component filters the number and time transactions are transmitted to the data interface component.

12. The system of claim 1, an industrial automation device persists local data to an object-oriented database via communication with the device interface component.

13. The system of claim 12, the communication is initiated with the device interface component by the automation device upon receipt of a remote command.

14. The system of claim 1, the data interface component communicates with a service including one of a network service and a web service.

15. The system of claim 1, wherein the device interface component batches the received statements from one or more automation devices and transmits the batches to the data interface component upon receipt of a predetermined number of statements.

16. The system of claim 15, wherein the device interface component employs at least one of a neural network, a Bayesian belief network, a fuzzy logic, a support vector machine and a classifier to aid in determining the batch size and time to transmit the batch.

* * * * *